(12) United States Patent
Finch et al.

(10) Patent No.: US 9,710,348 B2
(45) Date of Patent: *Jul. 18, 2017

(54) INDEPENDENT HARDWARE OPERATING STATE TRANSITIONS BY A TEST UNIT

(71) Applicant: International Business Machines Corporation, Armonk, NY (US)

(72) Inventors: Richard B. Finch, New Paltz, NY (US); Jason T. Hirst, Poughkeepsie, NY (US); Gerald G. Stanquist, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,183

(22) Filed: Sep. 3, 2015

(65) Prior Publication Data

US 2016/0274987 A1  Sep. 22, 2016

Related U.S. Application Data

(63) Continuation of application No. 14/662,318, filed on Mar. 19, 2015.

(51) Int. Cl.
G06F 11/263 (2006.01)
G06F 11/22 (2006.01)

(52) U.S. Cl.
CPC ........ *G06F 11/263* (2013.01); *G06F 11/2268* (2013.01)

(58) Field of Classification Search
USPC .......................................................... 714/33
See application file for complete search history.

(56) References Cited

U.S. PATENT DOCUMENTS

| 5,630,049 A * | 5/1997 | Cardoza ............. | G06F 11/3664 714/25 |
| 7,020,574 B2 * | 3/2006 | Eden ................... | G06F 11/3688 702/122 |
| 8,881,108 B2 * | 11/2014 | Tran .................... | G06F 11/3668 370/241 |
| 2009/0328205 A1 * | 12/2009 | Ims ..................... | G06F 21/6245 726/22 |
| 2010/0235814 A1 * | 9/2010 | Ohta ................... | G06F 11/3684 717/124 |

(Continued)

OTHER PUBLICATIONS

Finch et al., "Independent Hardware Operating State Transitions by a Test Unit," U.S. Appl. No. 14/662,318, filed Mar. 19, 2015.

(Continued)

*Primary Examiner* — Kamini Patel
(74) *Attorney, Agent, or Firm* — Nicholas D. Bowman (57) ABSTRACT

A test unit, operating in a first hardware operating state, receives a request for the input data from a test platform. In response to the receiving the request, the test unit determines that retrieving the input data requires the test unit to be in a second hardware operating state. In response to the determining, the test unit transitions from the first hardware operating state to the second operating hardware state. In the second hardware operating state, the test unit retrieves the input data. Once the test unit transitions to the second and correct hardware operating state, the test unit transmits the input data to the test platform.

9 Claims, 4 Drawing Sheets (56) References Cited

U.S. PATENT DOCUMENTS

| | | | | |
|---|---|---|---|---|
| 2012/0047487 A1* | 2/2012 | Ambichl | ............. | G06F 11/3684 |
| | | | | 717/124 |
| 2013/0055028 A1* | 2/2013 | Patil | ................... | G06F 11/3672 |
| | | | | 714/38.1 |
| 2013/0160130 A1* | 6/2013 | Mendelev | ............... | G06F 21/56 |
| | | | | 726/25 |
| 2013/0246849 A1* | 9/2013 | Plamondon | ......... | G06F 11/3688 |
| | | | | 714/27 |
| 2014/0156048 A1* | 6/2014 | Dekker | ................. | G05B 19/18 |
| | | | | 700/96 |
| 2015/0074743 A1* | 3/2015 | Ilieva | ..................... | H04L 63/10 |
| | | | | 726/1 |
| 2016/0132494 A1* | 5/2016 | Ghosh | .............. | G06F 17/30011 |
| | | | | 715/254 |

OTHER PUBLICATIONS

List of IBM Patents or Patent Applications Treated as Related, Sep. 1, 2015, 2 pages.

* cited by examiner

INDEPENDENT HARDWARE OPERATING STATE TRANSITIONS BY A TEST UNIT

BACKGROUND

The present disclosure relates to automated hardware testing and, more specifically, to transitioning between hardware operating states during hardware testing of a test unit.

Either as part of manufacturing or in a subsequent process, it is common to test the hardware of a computing system.

SUMMARY

According to embodiments of the present disclosure, aspects of the disclosure may include a method for transmitting input data. As part of the method, a test unit in a first hardware operating state receives a request for the input data from a test platform. In response to the receiving the request, the test unit determines that retrieving the input data requires the test unit to be in a second hardware operating state. In response to the determining, the test unit transitions from the first hardware operating state to the second operating hardware state. In the second hardware operating state, the test unit retrieves the input data. The test unit transmits the input data to the test platform.

According to embodiments of the present disclosure, aspects of the disclosure may include a computer program product for transmitting input data. The computer program product comprises a computer readable storage medium having program instructions embodied therewith. The program instructions are executable by a computer to cause the computer to perform a method. As part of the method, a test unit in a first hardware operating state receives a request for the input data from a test platform. In response to the receiving the request, the test unit determines that retrieving the input data requires the test unit to be in a second hardware operating state. In response to the determining, the test unit transitions from the first hardware operating state to the second operating hardware state. In the second hardware operating state, the test unit retrieves the input data. The test unit transmits the input data to the test platform.

According to embodiments of the present disclosure, aspects of the disclosure may include a test unit. The test unit comprises a memory and at least one processor in communication with the memory. The process is configured to perform a method. As part of the method, while the test unit is in a first hardware operating state, the processor receives a request for input data from a test platform. In response to the receiving the request, the processor determines that retrieving the input data requires the test unit to be in a second hardware operating state. In response to the determining, the processor transitions the test unit from the first hardware operating state to the second operating hardware state. While the test unit is in the second hardware operating state, the processor retrieves the input data. The processor transmits the input data to the test platform.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to automated hardware testing and, more specifically, to transitioning between hardware operating states during hardware testing of a test unit. While the present disclosure is not necessarily limited to such applications, various aspects of the disclosure may be appreciated through a discussion of various examples using this context.

During hardware testing of a computer system under test (e.g., the test unit), a test process may be performed on a separate test platform (e.g., a test cell) that requires obtaining data from the computer system (e.g., input data) in order to determine if the computer system is properly assembled and functioning correctly.

In some situations, the extraction of this input data requires close coordination between the state of the test platform and the state of the test unit. This may occur, for example, when the test platform is responsible for driving the states of the test unit. Such coordination may require one or more complex interfaces and synchronization between the test platform and the test unit. These complex interfaces may include, for example, a system console which may use low test unit system resources, but which also may require a complex emulation scheme and may be sensitive to text changes on its monitoring screen. For another example, Telnet may be used. Telnet may provide a faster connection than a system console, but it may also use more resources than the system console and may require the network stack to be up in the test unit. For another example, a dedicated API may be used. Such an API, however, may be non-native to the operating environment under test. For yet another example, a dedicated hardware connection may be used. The use of such a hardware connection may minimize resource sharing, but may add to the cost of manufacturing the test unit.

Furthermore, in some situations, the test platform may control the transitions between the hardware operating states (e.g., operating modes) of the test unit and may determine which hardware operating state the test unit should be in so that it can obtain specific input data for the testing process.

This determination of hardware operating states (and transitions between them) by the test platform may involve significant overhead, particularly when the test platform is not innately familiar with the hardware operating states of the test unit.

In some embodiments, a test unit may determine for itself the appropriate hardware operating states (and transitions between these hardware operating states) necessary to provide input data requested by a test platform. Further, the transitions between these hardware operating states may be driven by the test unit, rather than the test platform. More specifically, in some embodiments, a test unit of the present invention may be configured to receive requests for input data from a test platform on which a test process is run. The test unit may be further configured to determine the appropriate hardware operating state in which it needs to be in order to retrieve the requested input data. If the test unit is not in the correct hardware operating state, then it may be configured to transition itself to that hardware operating state, then retrieve the input data and transmit the input data to the test platform.

Furthermore, in some embodiments, a stateless interface of the present invention may link the test unit to the test platform. This may allow the test unit to make input data available asynchronously to the test process via the stateless interface between the test unit and the test platform. The interface may be maintained through a RESTful interface protocol. Further, the test process may be able to arrange its own state without regard to the state of the test unit.

Figure 1:
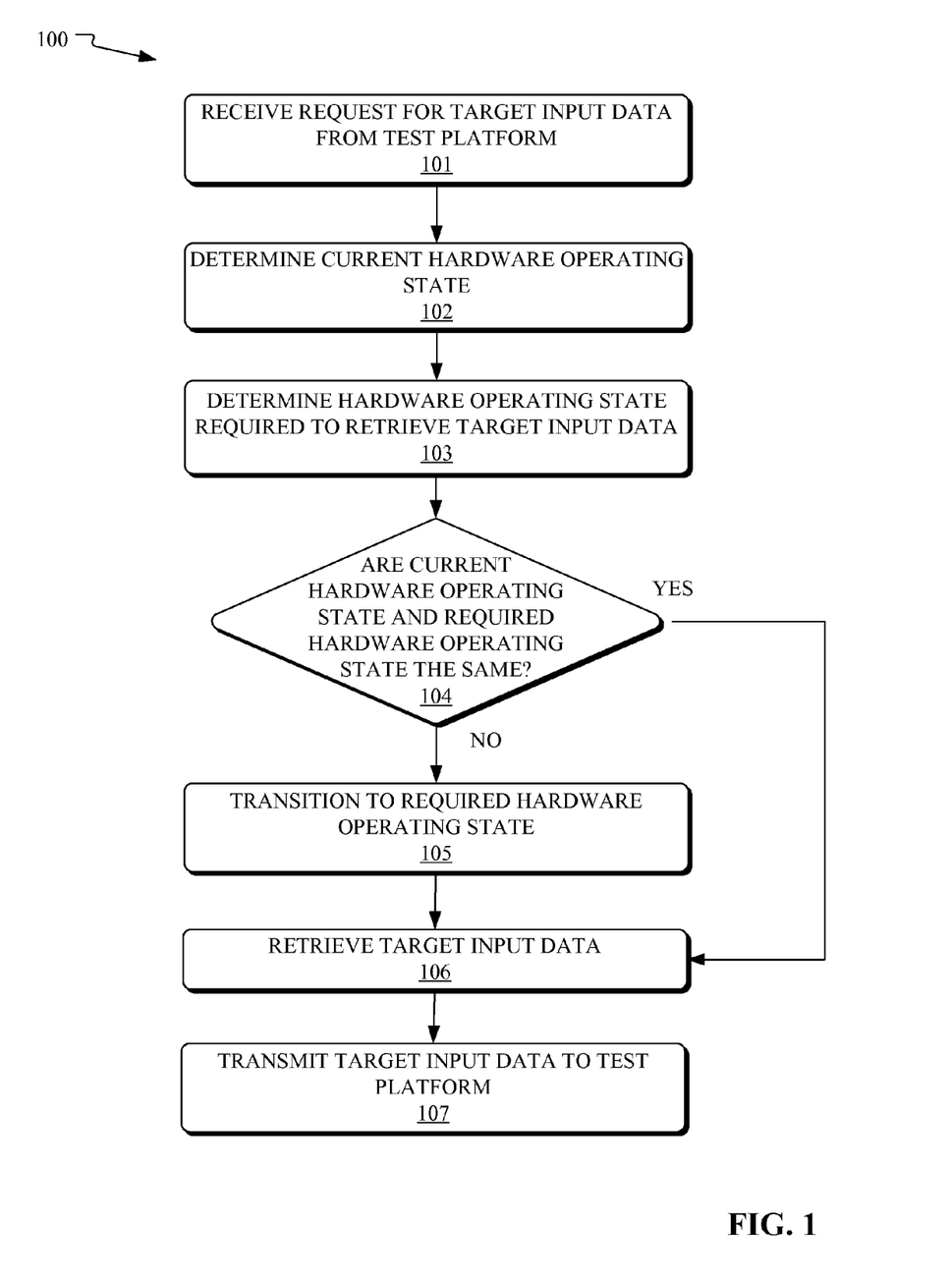
FIG. 1 illustrates a flowchart of an example method for transmitting target input data to a test platform during hardware testing of a test unit, in accordance with embodiments of the present disclosure.

Referring now to FIG. 1, shown is a flowchart of an example method 100 for transmitting target input data to a test platform during hardware testing of a test unit, in accordance with embodiments of the present disclosure. The method 100 may be performed by a computing system under test (e.g., test unit) communicatively coupled to a test platform. In some embodiments, the test unit and the test platform may be different forms of computers that each have some or all of the components of computer system 401 of FIG. 4 described herein.

Per operation 101, the test unit receives a request for target input data from the test platform. As used herein, in some embodiments, input data may refer to any data that is requested from a test unit by a test platform and used by the test platform for evaluating (e.g., measuring the capabilities or quality of) the hardware of the test unit. Such data may include, for example, metrics relating to hardware components of the test unit (e.g., processing power, available memory, etc.). The input data may be directly usable by the test platform for evaluating the test unit, or may need to be combined with other data, or further tested or processed by the test platform before the test platform can provide useful test results about the test unit.

In some embodiments, the request for target input data may be received via a stateless communication protocol. Further, in some embodiments, the request may be received via a RESTful product interface between the test platform and the test unit. The request may take the form of a standardized request, for example, in HTML format (e.g., a GET request).

Per operation 102, the test unit determines its current hardware operating state. Per operation 103, the test unit determines the hardware operating state in which it is required to be in order to obtain the target input data. Per operation 104, the test unit compares its current hardware operating state and the required hardware operating state. If the test unit determines that it is not in the required hardware operating state, then, per operation 105, the test unit transitions itself to the required hardware operating state before retrieving the target input data, per operation 106. If, however, the test unit determines in operation 104 that it is already in the required hardware operating state, then it may retrieve the target input data (per operation 106) without transitioning between hardware operating states.

Per operation 107, the target input data is transmitted from the test unit to the test platform. In some embodiments, the target input data may be transmitted via the same or different stateless communication protocol as was used to receive the request in operation 101. Further, the target input data may be provided in a standardized response format, for example, XML or JSON.

Figure 2:
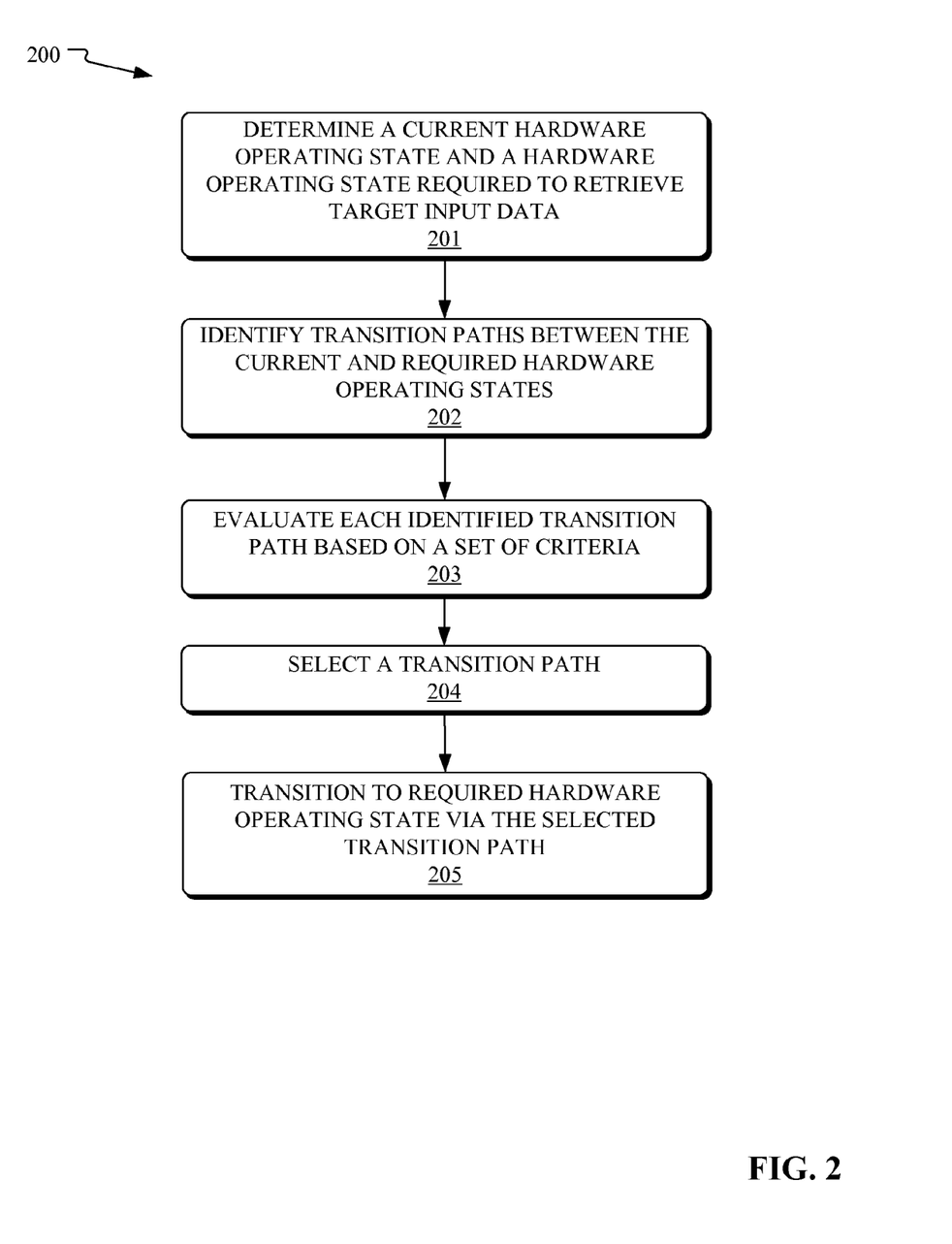
FIG. 2 illustrates a flowchart of an example method for selecting a transition path between a current hardware operating state and a required hardware operating state, in accordance with embodiments of the present disclosure.

In some embodiments, there may be multiple possible paths for a test unit to use to transition between its current hardware operating state and a hardware operating state that it must be in to retrieve target input data. Referring now to FIG. 2, shown is a flowchart of an example method 200 for selecting a transition path between a current hardware operating state and a required hardware operating state, in accordance with embodiments of the present disclosure. In some embodiments, this method 200 may be used in instances where a test unit has three or more hardware operating states and is configured such that it can transition between the current hardware operating state and required hardware operating state using different intermediary hardware operating states. In such embodiments, the test unit (and not the test platform) may determine which path to take.

The method 200 may begin at operation 201, wherein a test unit determines its current hardware operating state and a hardware operating state that is required to retrieve target input data. In some embodiments, operation 201 may be the same or substantially similar to a combination of operations 102-104 of FIG. 1.

Per operation 202, the test unit identifies transition paths between the current and required operating states. Per operation 203, the test unit evaluates each identified transition path based on a set of criteria (i.e., one or more criteria). The set of criteria may include, for example, amount of time to complete the transition or amount of power consumption to complete the transition.

Per operation 204, one of the evaluated transition paths is selected based on the application of the set of criteria. In some embodiments, once it is discovered that a particular identified transition path meets a minimum standard for the set of criteria, that transition path may be selected without the need to evaluate any remaining transition paths. Furthermore, in some embodiments, all of the identified transition paths may first be evaluated and scored based on the set of criteria before a single transition path (e.g., the one with the best score) is selected. Per operation 205, the test unit transitions from the current hardware operating state to the required hardware operating state via the selected transition path.

For an example of method 200 being utilized, a situation is considered wherein a test unit has four hardware operating states (one through four) and needs to transition from hardware operating state one to hardware operating state four in order to obtain requested input data. Continuing this example, the test unit determines that there are no direct transitions between these two hardware operating states and it must instead transition via a first path through hardware operating state two or via a second path through hardware operating state three. The test unit then compares the two paths using time to transition as its sole criterion for comparison. It determines that the first path will take ten seconds to complete, while the second path will only take five seconds to complete. Because the second path is faster, it is selected, and the test unit transitions from hardware operating state one to hardware operating state three to hardware operating state four.

Figure 3:
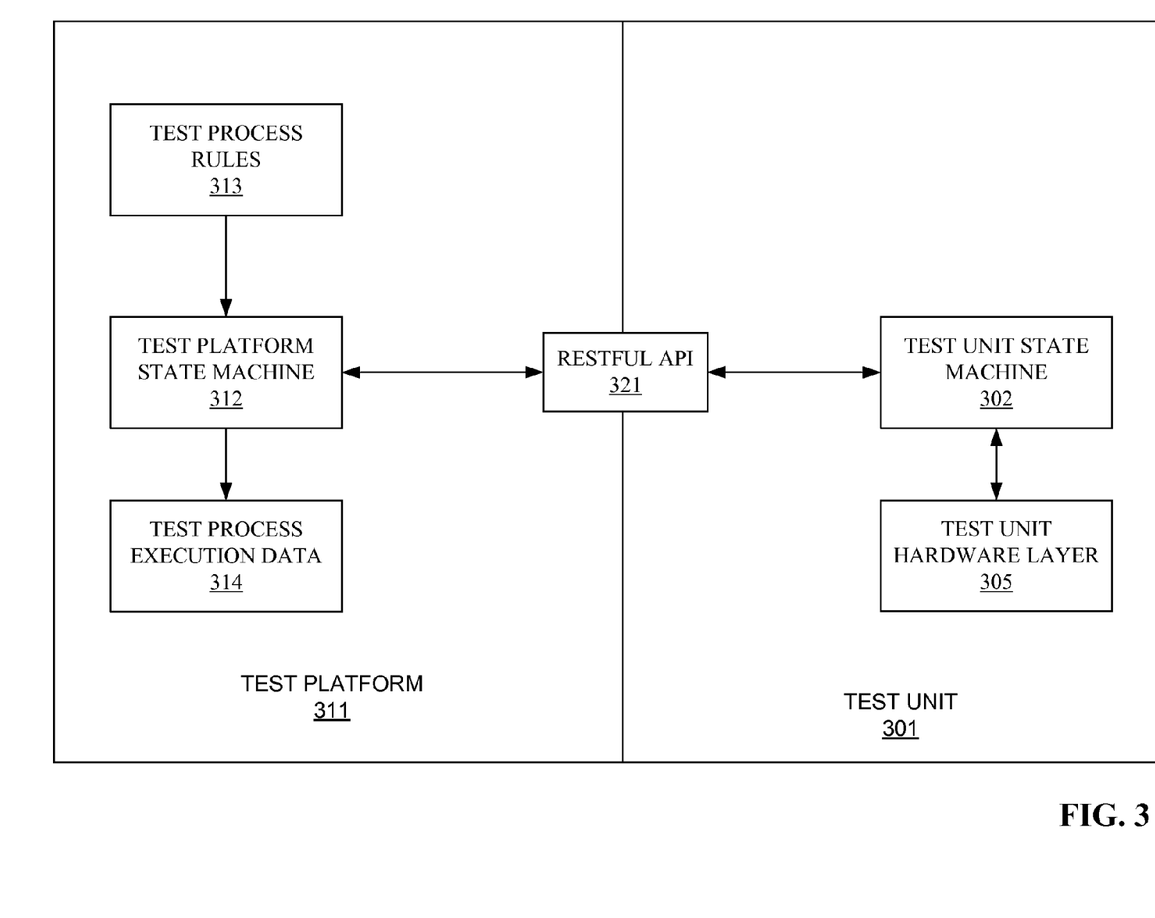
FIG. 3 illustrates a block diagram of an example interface between a test platform and a test unit, in accordance with embodiments of the present disclosure.

Referring now to FIG. 3, shown is a block diagram of an example interface between a test platform 311 and a test unit 301, in accordance with embodiments of the present disclosure. As shown, the test platform 311 and test unit 301 are communicatively coupled. In some embodiments, the test platform 311 and test unit 301 may be the same or substantially similar to the corresponding computer systems discussed in method 100 of FIG. 1. The test unit 301 includes a test unit state machine 302 and a test unit hardware layer 305. As used herein, in some embodiments, a state machine (e.g., finite state machine) may refer to an applicable computer component or system wherein a series of inputs are read by the applicable computer component or system and cause it to thereby switch between its possible states. The state that is switched to in a given situation may be dependent upon both the current (pre-switch) state and the particular input.

The test platform 311 includes a set of test process rules 313, a test platform state machine 312, and a set of test process execution data 314. The set of test process rules 313 may include one or more rules or testing parameters that are applied to input data received from the test unit 301 in order to generate test process execution data 314 (e.g., test results) that are used to evaluate the test unit 301.

Connecting the test platform 311 and the test unit 301 is a RESTful API 321. This API may serve as a stateless interface between the two computer systems. In some embodiments, the test platform 311 and/or the test unit 301 may be coupled to the RESTful API 321 indirectly rather than directly. This may occur, for example, where the test platform requires an intermediary interface that allows communication in the format required by the RESTful API 321.

In some embodiments, in use during hardware testing, the test process rules 313 may communicate a set of test parameters to the test platform state machine 312. Based on the input test parameters, the test platform state machine 312 may communicate, through the RESTful API 321, a request for input data to the test unit state machine 302. In response to the request, the test unit state machine 302 may communicate with the test unit hardware layer 305, which may generate the requested data and communicate it to the test unit state machine 302. Based on the output of the test unit hardware layer 305, the test unit state machine 302 may transmit the input data, through the RESTful API 321, to the test platform state machine 312. Based on the input data, the test platform state machine 312 may output test results as the test process execution data 314. These results may be read or evaluated to determine whether the test unit 301 meets the necessary hardware standards.

In some embodiments, the RESTful API 321 may serve to abstract the hardware testing interface into a test hardware independent side (e.g., the test platform 311) and a separate testing process independent side (e.g., the test unit 301). This may allow the testing process to execute independently of the test unit 301 and may allow the hardware of the test unit (e.g., test unit hardware layer 305) to operate independently of the test platform 311. In particular, each side of the testing interface may operate a separate state machine 302, 312 that executes its respective sequencing while being independent of the sequencing (or state) of the state machine 302, 312 on the other side of the testing interface.

In some embodiments, the RESTful API 321 may serve to remove the co-dependent sequencing between the state machines 302, 312 which require them to closely synchronize with each other. Instead, because of the stateless nature of the interface, the test platform 311 and test unit 301 may operate asynchronously.

In some embodiments, when the test processing side (e.g., the test platform 311) needs input data to proceed with a hardware test of the test unit 301, a REST request may be initiated with the testing interface in order to obtain the input data. This manner of interfacing may allow the hardware testing process to be written in such a fashion that it is concerned with the input data needed for test platform 311 to perform the test rather than on the overhead of driving the test unit state machine 302 in order to obtain that input data. Furthermore, in some embodiments where stateless communications are used, the test unit 301 may be responsible for driving the state of its own hardware layer 305 in order to obtain the input data requested by the test platform 311. This may involve the test unit state machine 302 being responsible for cycling the test unit 301 through it hardware operating states to collect crucial data and for executing product specific procedures to perform the hardware setup in the test unit 301 that may be required in order to collect the input data needed by the hardware testing process running on the test platform 311. More generally, this stateless communication may eliminate the need for the test platform 311 to control (or even know) the hardware operating states of the test unit 301.

To aid understanding, an example scenario of an embodiment of the present disclosure is provided herein. In this scenario, a manufacturer of a server (the test unit) wants to test the hardware of the server to make sure that it meets a purchaser's requirements before shipping the server off to the purchaser. In this example scenario, the server under test has five available hardware operating states: (1) pre-standby, (2) standby, (3) hypervisor standby, (4) hypervisor runtime, and (5) LPAR boot, and the server can only move through these hardware operating states sequentially. Prior to beginning the testing, the server is moved into a test cell and connected via Ethernet to a test platform. The test platform then directs the hardware testing of the server. In order for the server to be considered ready to ship, the test platform must complete a series of tasks to evaluate the quality of the server. In this scenario, there are five tasks, which include: (i) querying the firmware levels of the server, (ii) updating the server firmware, (iii) running an exerciser (e.g., a test of a particular hardware component of the server), (iv) collecting hardware part information from the server, and (v) deactivating the server's processors and memory (per the purchaser's request).

Throughout this scenario, the test platform remains unaware of the current hardware operating state of the server. The first task for the test platform is to query the firmware levels of the server. Therefore, the testing begins with the test platform transmitting a request, via a stateless interface, for the firmware levels (input data) to the server. The server determines that it is currently in hypervisor runtime hardware operating state. The server then determines that it needs to be in the standby hardware operating state to obtain the requested firmware levels. Because the current hardware operating state and the required hardware operating state are not the same, the server determines that it must transition between hardware operating states. The server then transitions itself from the hypervisor runtime hardware operating state to the hypervisor standby hardware operating state and then from the hypervisor standby hardware operating state to the standby hardware operating state. Once in the correct hardware operating state, the server obtains the firmware levels and transmits them, via the stateless interface, to the test platform. The test platform then uses the provided firmware level information to complete the first task.

The second task for the test platform is to update the server firmware. The test platform begins this task by transmitting the firmware updates, via the stateless interface, to the server. The server determines that loading the firmware updates requires it to be in the standby hardware operating state (which it is currently in). The server then loads firmware updates, thereby causing the second task to be completed by the test platform.

The third task for the test platform is to run an exerciser on the server. The test platform notifies the server of the exerciser, via the stateless interface. The server then determines that running the exerciser requires it to be at the LPAR boot hardware operating state. Because it is currently in the standby hardware operating state, the server does an initial program load to transition to the hypervisor standby hardware operating state, then another transition to hypervisor runtime hardware operating state, and then a third transition (by booting the LPAR) to get to the LPAR boot hardware operating state. Once in the necessary hardware operating state, the server runs the exerciser and transmits the results (as input data) to the test platform via the stateless interface.

The fourth task is to collect hardware part information from the server. The request for the part information is sent via the stateless interface to the server. The server determines that collecting part information requires it to have the LPAR booted. It then confirms that it is in the LPAR boot hardware operating state, collects the part information, and transmits the part information via the stateless interface to the test platform.

The final task is to deactivate the server's processors and memory. The test platform, therefore, instructs the server to complete the deactivation via the stateless interface. The server determines that such deactivation requires it to be in the standby hardware operating state, so it transitions, via the hypervisor runtime and hypervisor standby hardware operating states, from the LPAR booted hardware operating state to the standby hardware operating state. Once in the desired hardware operating state, the server performs the instructed deactivations. This completes the hardware testing of the server.

Figure 4:
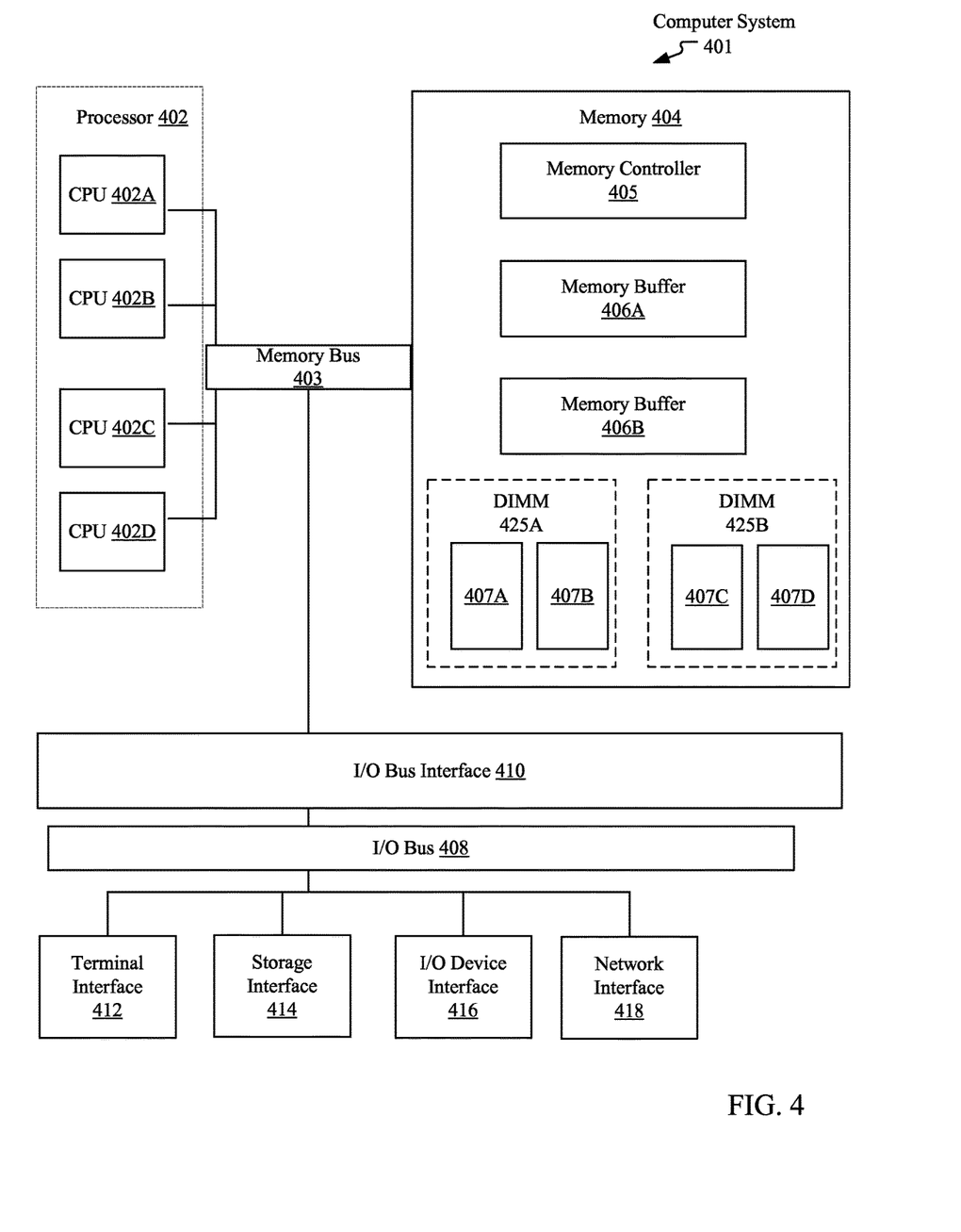
FIG. 4 illustrates a high-level block diagram of an example computer system that may be used in implementing one or more operations of the methods described herein, in accordance with embodiments of the present disclosure.

Referring now to FIG. 4, shown is a high-level block diagram of an example computer system (i.e., computer) 401 that may be used in implementing one or more of the methods, tools, and modules, and any related functions or operations, described herein (e.g., using one or more processor circuits or computer processors of the computer), in accordance with embodiments of the present disclosure.

In some embodiments, computer system 401 may be a test platform or test unit described herein. In some embodiments, the major components of the computer system 401 may comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may comprise one or more levels of on-board cache.

In some embodiments, the memory subsystem 404 may comprise a random-access semiconductor memory, storage device, or storage medium (either volatile or non-volatile) for storing data and programs. In some embodiments, the memory subsystem 404 may represent the entire virtual memory of the computer system 401, and may also include the virtual memory of other computer systems coupled to the computer system 401 or connected via a network. The memory subsystem 404 may be conceptually a single monolithic entity, but, in some embodiments, the memory subsystem 404 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In some embodiments, the main memory or memory subsystem 404 may contain elements for control and flow of memory used by the CPU 402. This may include all or a portion of the following: a memory controller 405, one or more memory buffers 406A and 406B and one or more memory devices 425A and 425B. In some embodiments, the memory devices 425A and 425B may be dual in-line memory modules (DIMMs), which are a series of dynamic random-access memory (DRAM) chips 407A-407D (collectively referred to as 407) mounted on a printed circuit board and designed for use in personal computers, workstations, and servers. The use of DRAMs 407 in the illustration is exemplary only and the memory array used may vary in type as previously mentioned.

Although the memory bus 403 is shown in FIG. 4 as a single bus structure providing a direct communication path among the CPUs 402, the memory subsystem 404, and the I/O bus interface 410, the memory bus 403 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail below, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transmitting input data from a test unit, the test unit having at least a first hardware operating state and a second hardware operating state, the method comprising:

receiving, by the test unit in the first hardware operating state, a request, from a test platform, for the input data;

determining, by the test unit and in response to the receiving the request, that retrieving the input data requires the test unit to be in the second hardware operating state;

identifying, by the test unit and in response to the determining, a first transition path between the first hardware operating state and the second hardware operating state and a second transition path between the first hardware operating state and the second hardware operating state, wherein the first transition path includes a transition from the first hardware operating state to a third hardware operating state and a transition from the third hardware operating state to the second hardware operating state, and wherein the second transition path includes a transition from the first hardware operating state to a fourth hardware operating state and a transition from the fourth hardware operating state to the second hardware operating state;

evaluating, based on a set of criteria, the first transition path and the second transition path;

selecting, based on the evaluating, the first transition path over the second transition path;

transitioning, by the test unit and in response to the determining, from the first hardware operating state to the second operating hardware state, wherein the transitioning from the first hardware operating state to the second operating hardware state is via the first transition path;

retrieving, by the test unit in the second hardware operating state, the input data; and transmitting, by the test unit, the input data to the test platform.

2. The method of claim 1, wherein the receiving the request and the transmitting the input data occur via a stateless interface between the test unit and the test platform.

3. The method of claim 2, wherein the receiving the request and the transmitting the input data occur via a RESTful interface between the test unit and the test platform.

4. The method of claim 1, wherein the test unit drives the transitioning of the test unit from the first hardware operating state to the second hardware operating state.

5. The method of claim 1, wherein the test platform does not drive the transitioning of the test unit from the first hardware operating state to the second hardware operating state.

6. The method of claim 1, wherein the receiving the request and the transmitting the input data occur via different stateless communication protocols.

7. The method of claim 1, wherein the transition from the third hardware operating state to the second hardware operating state includes a transition from the third hardware operating state to a fifth hardware operating state and a transition from the fifth hardware operating state to the second hardware operating state.

8. The method of claim 1, wherein the transition from the fourth hardware operating state to the second hardware operating state includes a transition from the fourth hardware operating state to a fifth hardware operating state and a transition from the fifth hardware operating state to the second hardware operating state.

9. The method of claim 1, wherein the set of criteria includes an amount of time to complete the transition.

* * * * *